3,239,428
PREPARATION OF 6-AMINOPENICILLANIC ACID
BY *ARTHROBACTER VISCOSUS*
Hideo Takeda Toyokawa, Aichi, Ikuo Iwatsuki, Aichi, and Tetsuji Miyano, Nagoya, Aichi, Japan, assignors to Banyu Pharmaceutical Co. Ltd., Tokyo, Japan, a corporation of Japan
No Drawing. Filed Apr. 30, 1964, Ser. No. 363,999
10 Claims. (Cl. 195—36)

This invention relates to a novel process for the preparation of 6-aminopenicillanic acid. More particularly, this invention relates to a novel process for enzymatically hydrolyzing penicillins to 6-aminopenicillanic acid. This invention also relates to a process for the preparation of a penicillin-splitting enzyme.

The importance of 6-aminopenicillanic acid as a valuable intermediate for the preparation of various penicillins is well known in the art. It has been used to produce numerous novel penicillins by its reaction with acylating agents such as acid chlorides and acid anhydrides. Many such novel penicillins have already exhibited potent antibacterial activity and some, in addition, have surprising attributes, such as enhanced activity against resistant organisms and resistance to destruction by acid and by penicillinase. Some of these novel penicillins, which are often called "synthetic penicillins," are already commercially available.

It has recently become known that 6-aminopenicillanic acid is produced by fermentation of a penicillin-producing mold in a suitable nutrient medium, but very small yields are obtained. More recently, 6-aminopenicillanic acid has been produced by enzymatic hydrolysis of penicillins. Such enzymes used in the process are obtained from bacteria and fungi.

However, due to the importance of 6-aminopenicillanic acid for preparing novel penicillins, and particularly since it is used in the commercial production of the "synthetic penicillins" workers in the art have continued to search for new methods for preparing 6-aminopenicillanic acid.

It is therefore an object of this invention to provide a novel process for the preparation of 6-aminopenicillanic acid.

Another object of this invention is to provide a novel method for the preparation of a pencillin-plitting enzyme.

In accordance with the present invention, the above and other objects which will become apparent as this specification proceeds have been accomplished by the provision of a process which comprises contacting benzylpenicillin with an enzyme produced by the microorganism *Arthrobacter viscosus* to produce 6-aminopenicillanic acid.

It has been discovered that benzylpenicillin (penicillin G) can be converted to 6-aminopenicillanic acid by means of an enzyme or group of enzymes which is produced by a new species of the genus Arthrobacter, designated *Arthrobacter viscosus* sp. nov. The term "benzylpenicillin" as used herein refers to 6-(phenylacetamido)penicillanic acid and salts thereof, including such metallic salts as the sodium, potassium, calcium and aluminum salts, the ammonium salts and the substituted ammonium salts, e.g. triethylamine, procaine, etc. The term "enzyme" is intended to include the enzyme or group of enzymes produced by cultivation of *Arthrobacter viscosus* sp. nov., that hydrolyze penicillin to 6-aminopenicillanic acid.

In general, penicillin-splitting enzymes produced by cultivation of microorganisms such as *Escherichia coli*, and those described in United States Patents Nos. 3,088,880, 3,109,779, 3,116,218 and 3,121,667, have been cell-associated. Therefore, it was quite surprising when it was discovered afer cultivating *Arthrobacter viscosus*, that a large portion of the enzyme activity is in the medium.

The enzyme-producing microorganism used in the process of the present invention was isolated from a sample of soil collected at Anjo City, Aichi Prefecture, Japan. The microorganism is a new species of the genus Arthrobacter, and has been designated *Arthrobacter viscosus* sp. nov. A culture of the living organism, given the laboratory designation A-9722, has been deposited in the American Type Culture Collection, Washington, D.C., and added to its permanent collection of microorganisms as A.T.C.C. 15294.

The morphological and cultural characteristics of *Arthrobacter viscosus*, A.T.C.C. 15294, are set forth below.

Morphology: Rods in chains, particularly young broth cultures, rods variable in size and shape, predominantly 0.8–1.0 x 2.0–7.0µ in a 24-hour culture. V-shaped pairs are very common indicating a snapping type division, cells may be curved, straight or swollen. Bulbous cells frequently formed in older cultures, particularly on solid media. Fragmentation of the rods into smaller rods and coccal bodies occurs within 72 hours. Cocci 0.5–1.0µ. Gram variable, rods and cocci predominantly Gram-positive. Feebly motile.

Gelatin stab: Slow stratiform liquefaction at 22–24° C., white sediment, liquid turbid.

Gelatin agar streak plate: Wide zone of hydrolysis.

Trypticase soy agar colonies: Circular, 1–2 mm. at 24 hours, 3–5 mm. at 48 hours, entire, convex to pulvinate, shiny, viscid, finely granular, cream colored. Culture produces a stable rough form with a lobate margin and a rough surface.

Trypticase soy agar slant: Growth abundant, filiform, edge slightly wrinkled, shiny, viscid, cream colored.

Nutrient soil extract agar slant: Growth similar to that on trypticase soy agar slant.

Glucose asparagine agar slant: Growth moderate, filiform, white wrinkled edge, growth poor at 35° C. in 24 hours.

Glucose nutrient broth: Moderate growth, uniform turbidity, fine sediment, pH 7.5 after 7 days (rough variant ph 6.9).

Four percent NaCl nutrient broth: Moderate growth, uniform turbidity, no growth in 7% NaCl broth.

Trypticase soy broth: Growth moderate, uniform turbidity, fine sediment, no surface growth (slight ring after 7 days).

Potato: No growth at 28° C. or 35° C. (rough variant produces moderate to abundant shiny, light brown growth at both 28° C. and 35° C.).

Purple milk: Variable, no change to slight peptonization at 7 days, reaction unchanged to slightly alkaline.

Methyl red test: Negative.

Nitrites not produced from nitrates in tryptone nitrate medium.

Indole not produced.

Acetylmethylcarbinol not produced.

Hydrogen sulfide not produced from thiosulfate.

Starch agar streak plate: Starch not hydrolyzed after 7 days.

Casein agar streak plate: Slow hydrolysis of casein.

Hemolysis of blood: Negative.

No acid from glucose or lactose in proteose peptone broth.

Urease production variable, smooth strain usually negative, rough strain strongly positive.

Utilizes ammonium salts as a nitrogen source; citrates utilized as a sole source of carbon (growth on modified Koser's Citrate Medium, but no growth on Simmons Citrate Agar).

Catalase positive.

Aerobic, no growth in glucose nutrient broth under anaerobic conditions.

Optimum temperature, between 28° C. and 35° C., fair growth at 10° C. and 40° C., no growth at 45° C.

*Arthrobacter viscosus* sp. nov. most closely resembles *Arthrobacter simplex*, listed in Bergey's Manual of Determinative Bacteriology, Seventh Edition. The fact that this culture utilizes nitrates or ammonium salts as a sole source of nitrogen, utilizes citrate as a sole organic nutrient, is non-chromogenic, does not hydrolyze starch and grows well at 37° C., places it next to *Arthrobacter simplex* in Bergey's species key.

*Arthrobacter viscosus* sp. nov. differs from *Arthrobacter simplex* in the formation of much larger cells, turbid growth in the liquefied portion of a gelatin stab culture, the ability to produce urease, the inability to produce hydrogen sulfide in thiosulfate media, the ability to grow at 10° C., and the inability to produce nitrites from nitrates.

*Arthrobacter viscosus* sp. nov. may be distinguished from Arthrobacter sp. NRRL B-2743, disclosed in United States Patent No. 3,116,218, on the basis that the cells of *Arthrobacter viscosus* cultures are predominantly Gram-positive, while those of Arthrobacter sp. NRRL B-2743 are predominantly Gram-negative. The cells of Arthrobacter sp. NRRL B-2743 are smaller than those of *Arthrobacter viscosus* especially when grown on semi-solid media. Arthrobacter sp. NRRL B-2743 will not grow in a synthetic salt solution containing ammonium salts as the sole nitrogen source and citrate as the sole organic nutrient, while *Arthrobacter viscosus* grows well in this medium. Other differences between these two cultures are summarized in Table I.

salts, mineral salts such as sodium chloride, potassium chloride, and magnesium sulfate; buffering agents such as calcium carbonate, borates, or phosphates and trace amounts of heavy metal salts. Such medium ingredients include those listed in Canadian Patent No. 513,324 and in British Patents Nos. 730,431 and 736,325, and in United States Patents Nos. 2,691,618, 2,658,018, 2,653,899, 2,-586,762, 2,516,080, 2,483,892, 2,609,329 and 2,709,672. Examples of suitable nutrient media are set forth in the examples below. The preferred nutrient media are those which include sources of carbon and nitrogen derived from natural sources such as meat extracts, e.g., infusion from beef heart, hydrolyzed animal protein (by proteolytic enzymes or otherwise, a number of which are commercially available), vegetable extracts such as corn steep liquor, etc. In deep aerated submerged cultivation, an antifoam agent such as liquid paraffin, fatty oils and/or silicone is frequently used to control foaming. Generally, the cultivation is continued until a quantity of enzyme is accumulated in the medium.

Cultivation of *Arthrobacter viscosus* requires from about 6 to 72 hours to produce practical amounts of the enzyme, and 24 to 72 hours' growth will generally be adequate. A substantial amount of the enzyme or mixture of enzymes is generally found in the broth although some is also found in the vegetative growth obtained from the cultivation of the organism.

6-aminopenicillanic acid is prepared by contacting benzylpenicillin with the penicillin-splitting enzyme pro-

TABLE I

| | *Arthrobacter viscosus* A.T.C.C. 15294 | Arthrobacter sp. NRRL B-2743 |
|---|---|---|
| Colonies on Trypticase Soy Agar (24 hours at 28° C.). | 1.0-1.5 mm. diameter, circular, convex to pulvinate, viscid. | Punctiform colonies, non-viscid. |
| Trypticase Soy Agar Slant (24 hours at 28° C.). | Growth filiform, cream colored, viscid. | Growth filiform, cream colored, non-viscid. |
| Gelatin Agar Streak (gelatin hydrolysis). | Hydrolysis of gelatin positive at 3 days. | Hydrolysis of gelatin negative at 7 days. |
| Twelve Percent Gelatin Stab (7 days at 22-24° C.). | Stratiform liquefaction. | No liquefaction. |
| Urease Activity (BBL Urease Test Medium). | Positive at 3 days. | Negative at 3 and 7 days. |
| Casein Agar Streak Plate (7 days at 28° C.). | Positive hydrolysis of casein. | Negative hydrolysis of casein. |
| Reduction of Nitrates to Nitrites. | Negative at 7 days. | Positive at 24 hours. |
| Temperature Relations: | | |
| Growth at 10° C. (after 10 days). | Fair. | None to very slight. |
| Growth at 22-24° C. (after 2 days). | Moderate. | Moderate. |
| Growth at 28° C. (after 24 hours). | Abundant. | Abundant. |
| Growth at 37° C. (after 2 days). | do. | None to very slight. |
| Growth at 40° C. (after 2 days). | Fair. | None. |

The penicillin-splitting enzyme or mixture of enzymes is produced by inoculating cells of *Arthrobacter viscosus* into a suitable aqueous nutrient medium and then cultivating, preferably under aerobic conditions. Cultivation on a solid medium is possible, but for practical production in a large volume, cultivating in a liquid medium is preferred. The temperature of cultivation may be varied in a wide range, e.g., from about 10° C. to about 40° C., i.e., the temperature range within which the organism can grow, but a temperature of from about 28° C. to 35° C. is generally preferred. In general, the cultivation is carried out at a temperature of about 32° C. the pH of the aqueous nutrient medium is preferably adjusted to at least about 7.0, and preferably about 7.0 to 9.5, before the cultivation is commenced. It has been found that the pH increases during cultivation.

In the cultivation of the organism for the production of the enzyme or mixture of enzymes capable of splitting benzylpenicillin, the medium may contain as a source of carbon, a commercially available glyceride oil or carbohydrate such as starch, glucose, glycerol, maltose, dextrin, sucrose, lactose, etc., in pure or crude states; as the combined source of nitrogen and carbon, an organic material such as soybean meal, distiller's solubles peanut meal, cottonseed meal, meat extract, peptone, fish meal, yeast extract, corn steep liquor, etc., and when desired, inorganic sources of nitrogen such as nitrates, ammonium duced during the cultivation of *Arthrobacter viscosus*. The whole broth containing the vegetative growth may be used, but preferably, the supernatant is separated from the vegetative growth, e.g., by centrifugation, before use in the process. However, the cells can also be used since they contain some enzyme activity. Benzylpenicillin is added in liquid solution, e.g., water to the whole broth or supernatant liquor whereby enzymatic hydrolysis of the added benzylpenicillin is accomplished. The enzymatic hydrolysis generally requires from 2 to 30 hours to go to substantial completion. The hydrolysis proceeds at a temperature of from about 20° C. to 50° C., and is preferably conducted at a temperature of from about 30° C. to 40° C., with 37° C. being a good operating temperature. During the enzymatic hydrolysis, it is desirable to maintain the pH of the reaction mixture at a pH of from about 7.0 to 9.5 and a pH of about 8.0 to 9.0 is preferred. Since the pH of the reaction mixture tends to drop during the hydrolysis, it may be necessary to make some pH adjustment during the course of the reaction.

After the termination of the enzymatic hydrolysis, any insoluble vegetative material present is removed from the reaction mixture as by filtration. Any unreacted penicillin which may be present in the reaction mixture and the phenylacetic acid which is split off during the reaction can be removed by extraction with an organic solvent, e.g. methyl isobutyl ketone, n-butanol or butyl acetate, at an acid pH, e.g., pH 2 to 3.

In another method of hydrolyzing benzylpenicillin to 6-aminophenicillanic acid, adsorbent material such as diatomaceous earth or charcoal is added to the whole broth or supernatant (about 3 gm. absorbent material per 100 ml. of broth or supernatant); the penicillin-splitting enzyme being absorbed thereon. The enzyme-containing absorbent material is separated with the vegetative growth or alone as the case may be, and such material is added to an aqueous solution of benzylpenicillin or packed into a column. Benzylpenicillin in liquid solution is passed through the column whereby enzymatic hydrolysis of the added benzylpenicillin is accomplished. This method for preparing 6-aminopenicillanic acid is semi-continuous and is carried out under the same conditions as described hereinabove.

In a convenient method for the assay for 6-aminopenicillanic acid formed by the enzymatic hydrolysis of benzylpenicillin, the solution containing the 6-aminopenicillanic acid is diluted with 0.1 M potassium phosphate buffer (pH 7.0) in a 1:20 ratio and equal amounts (about 10 microliters) of the diluted solution are placed with a microsyringe in one spot on each of two identically marked paper strips. One strip is sprayed twice with phosphate buffer solution (pH 7.5; 0.1 M) then twice with a 5% solution of phenylacetyl chloride in acetone, then twice again with the buffer solution (strip dried between each spraying). Both strips (sprayed and unsprayed) are then placed side by side in a plate containing an even dispersion of *Bacillus subtilis* on nutrient agar and incubated overnight at 28° C. The presence of a zone of inhibition surrounding the spot indicates the formation of benzylpenicillin by reaction of the phenylacetyl chloride with the 6-aminopenicillanic acid produced by the enzymatic hydrolysis of the benzylpenicillin. The quantity of 6-aminopenicillanic acid is determined by direct comparison of the spots produced on the spray strip by the benzylpenicillin formed from the 6-aminopenicillanic acid with spots produced by known quantities of benzylpenicillin.

It should be understood that the process of this invention is not limited to the use of *Arthrobacter viscosus*, A.T.C.C. 15294, but includes all penicillin-splitting enzyme-producing strains of *Arthrobacter viscosus*. It also includes the use of penicillin-splitting enzyme-producing mutants produced from strains of *Arthrobacter viscosus* by various means such as X-radiation, ultraviolet radiation and nitrogen mustards.

The following examples are intended to illustrate the invention described herein without unduly restricting it.

*Example I*

A production medium consisting of corn steep liquor (5,200 gm.), glucose (650 gm.), phenyl acetic acid (650 gm.), and ammonium chloride (130 gm.), dissolved in 130 liters of water was prepared and adjusted to pH 7.6 and sterilized for 30 minutes. This medium was inoculated with 1 liter of a 27.5-hour shake culture of *Arthrobacter viscosus*, A.T.C.C. 15294, incubated in a medium consisting of 0.5% glucose, 1.0% peptone, 0.5% beef extract, 0.25% sodium chloride, 0.1% yeast, and water, and having a pH of 7.0. The mixture was cultivated at 28° C. for 47 hours. Sterilized air was introduced into the mixture at the rate of 0.1 to 0.2 liter per minute per liter of broth for 24 hours and then the rate was increased to 0.3 to 0.4 liter per minute per liter of broth. After 47 hours, the mycelium was collected by centrifuging, and washed with borate buffer (pH 8.5). About 4,600 gm. of wet myclium was obtained.

To 0.2 liter of an aqueous solution of benzylpenicillin (100,000 μ/ml.) was added 735 gm. of wet mycelium. The mixture was stirred at 37° C. for 4 hours and the pH adjusted to 8.5 by the addition of dilute sodium hydroxide. After 4 hours of reaction, the mixture was assayed for 6-aminopenicillanic acid and benzylpenicillin separately, and found to contain 26,200 mcg./ml. of 6-aminopenicillanic acid, and 2,700 μ/ml. of benzylpenicillin, corresponding to a 71.5% yield.

*Example II*

*Arthrobacter viscosus*, A.T.C.C. 15294, was cultivated at 28° C. for 47 hours in the production medium described in Example I. To 120 liters of the broth was added 6 kg. of diatomaceous earth, and the mixture stirred for 30 minutes. The diatomaceous earth was separated by centrifuging, and there was obtained a wet cake weighing 13,800 gm. To 20 liters of an aqueous benzylpenicillin solution (75,250 μ/ml.), 4,600 gm. of the wet cake was added, and the mixture stirred for 4 hours at 37° C., while maintaining the pH at 8.5 with dilute sodium hydroxide. The mixture was found to contain 20,000 mcg./ml. of 6-aminopenicillanic acid, and 6,720 μ/ml. of benzylpenicillin.

*Example III*

*Arthrobacter viscosus*, A.T.C.C. 15294, was cultivated at 28° C. for 47 hours in the production medium described in Example I. To 800 liters of broth was added diatomaceous earth, and the mixture stirred for 30 minutes. The diatomaceous earth was separated by centrifuging, and was added to a 38,650 μ/ml. aqueous solution of benzylpenicillin (850 liters). After 2 hours' reaction at 37° C. and at pH 8.5, 8,520 mcg./ml. of 6-aminopenicillanic acid was obtained, which corresponds to 9,370 gm. of 6-aminopenicillanic acid, or a yield of 82.4%.

*Example IV*

*Arthrobacter viscosus*, A.T.C.C. 15294, was cultivated at 28° C. for 47 hours in the production medium described in Example I. Twenty-five kg. of diatomaceous earth was added to 500 liters of broth, separated by centrifuging, and washed with borate buffer (pH 8.5). The cake was added to 1,050 liters of benzylpenicillin fermentation broth filtrate (7,010 μ/ml.). After 2 hours at 37° C. and at pH 8.5, the 6-aminopenicillanc acid content of the reaction filtrate was 2,175 mcg./ml. This corresponds to 2,610 gm. of 6-aminopenicillanic acid, and a yield of 88.2%.

*Example V*

The cultivation of *Arthrobacter viscosus*, A.T.C.C. 15294, was carried out according to Example I. Three-hundred liters of the broth was added to 1,000 liters of benzylpenicillin fermentation broth (8,880 μ/ml.). After 2 hours' reaction at 37° C. and pH 8.5, it was found that the mixture contained 2,375 mcg./ml. of 6-aminopenicillanic acid. Total 6-aminopenicillanic acid formed was 2,850 gm., or a yield of 86.6%.

*Example VI*

A solution of benzylpenicillin was treated with the enzyme produced by *Arthrobacter viscosus*, A.T.C.C. 15294, in accordance with the above examples. Ninety-five liters of a solution containing 12,720 mcg./ml. of 6-aminopenicillanic acid were obtained. Total 6-aminopenicillanic acid in the solution was calculated to be 1,210 gm. The solution was cooled at 5° C., methyl isobutyl ketone (35 liters) added, and stirred for 15 minutes at pH 2.0 to remove penicillin and other acidic materials. The aqueous layer was neutralized to the isoelectric point with dilute sodium hydroxide, and 6-aminopenicillanic acid precipitated. The 6-aminopenicillanic acid was found to weigh 765 gm., and have a purity of 94%.

*Example VII*

*Arthrobacter viscosus*, A.T.C.C. 15294, was cultivated according to the method of Example I. Two hundred fifty ml. of the broth were centrifuged, giving 200 ml. of clear broth. To this was added 300 ml. of saturated ammonium sulfate solution at 0° C., and kept overnight in a refrigerator. The precipitate was collected by centrifuging, and dissolved in aqueous ammonia. Twenty-five ml. of enzyme solution was obtained. The enzyme solution was diluted with 100 ml. of borate buffer solution (pH 8.5) and 1.5 gm. of benzylpenicillin was added. The penicillin concentration of the resulting solution was 20,000 $\mu$/ml. After 30 minutes' reaction at 37° C., 6,420 mcg./ml. of 6-aminopenicillanic acid was obtained, corresponding to a yield of 88.1%.

*Example VIII*

An aqueous nutrient medium was prepared having the following composition:

| | Percent |
|---|---|
| Glucose | 0.5 |
| Corn steep liquor | 3.0 |
| Ammonium nitrate | 0.5 |
| Calcium carbonate | 0.5 |
| Milk solids | 1.0 |
| Water | 94.5 |

One hundred ml. of this medium was added to a 500-ml. flask, inoculated with a test tube slant culture of *Arthrobacter viscosus*, A.T.C.C. 15294, and incubated for 24 hours at 32° C. on a shaker. After 24 hours' incubation, 1 ml. of the resulting suspension was used to inoculate each of six 500-ml. flasks containing 100 ml. of the above nutrient medium. The flasks were incubated at 32° C. for 67 hours on a shaker, and then the vegetative growth removed by centrifuging the medium at 6,000 r.p.m. for 30 minutes.

To 450 ml. supernatant having a pH of 8.6, was added 18 gm. diatomaceous earth (Dicalite); the mixture stirred at room temperature for 30 minutes; and poured into a 2 x 30 cm. column and packed with gentle air pressure. A 1,000-ml. aqueous solution of potassium benzylpenicillin (25 mg./ml.) in 0.2 M potassium phosphate buffer solution (pH 8.6) having a pH of 8.3 was added to the reservoir of the column and passed through the column at a flow rate of 0.8 to 0.9 ml. per minute. Ten-ml. fractions were collected and assayed for 6-aminopenicillanic acid. The data are presented in the following table.

TABLE II

| Fraction No. | pH | 6-aminopenicillanic acid, $\mu$gm./ml. |
|---|---|---|
| 1 | 8.7 | 300 |
| 2 | 8.75 | 350 |
| 3 | 8.75 | 250 |
| 4 | 8.75 | 300 |
| 5 | 8.65 | 1,820 |
| 6 | 7.95 | 7,930 |
| 7 | 7.8 | 6,250 |
| 8 | 7.8 | 6,000 |
| 9 | 7.8 | 5,250 |
| 10 | 7.85 | 4,900 |
| 11 | 7.85 | 4,400 |
| 12 | 7.9 | 4,100 |
| 13 | 7.95 | 3,600 |
| 14 | 7.8 | 4,400 |
| 15 | 7.8 | 3,930 |
| 16 | 7.9 | 3,700 |
| 17 | 7.9 | 3,400 |
| 18 | 7.85 | 3,100 |
| 19 | 7.9 | 2,830 |
| 20 | 8.0 | 2,730 |
| 21 | 7.95 | 2,500 |
| 22 | 8.0 | 2,300 |
| 23 | 8.0 | 2,020 |
| 24 | 8.1 | 1,630 |
| 25 | 8.1 | 1,400 |

Maximum conversion was obtained in Fraction 6. Since 25 mg./ml. of potassium benzylpenicillin is approximately equivalent to 14,500 $\mu$gm./ml. of 6-aminopenicillanic acid, the conversion in Fraction 6 was $$\frac{7,930}{14,500} \times 100 = 54\%$$

While this invention has been described and exemplified in terms of its preferred embodiment, those skilled in the art will appreciate that modifications can be made without departing from the spirit and scope of this invention.

We claim:

1. A process for the preparation of 6-aminopenicillanic acid which comprises contacting benzylpenicillin with a penicillin-splitting enzyme produced by the microorganism *Arthrobacter viscosus* to produce 6-aminopenicillanic acid.

2. A process for the preparation of 6-aminopenicillanic acid which comprises contacting benzylpenicillin with a penicillin-splitting enzyme produced by the microorganism *Arthrobacter viscosus*, A.T.C.C. 15294, to produce 6-aminopenicillanic acid.

3. A process for the preparation of 6-aminopenicillanic acid which comprises contacting benzylpenicillin with a penicillin-splitting enzyme produced by the microorganism *Arthrobacter viscosus*, A.T.C.C. 15294, and recovering 6-aminopenicillanic acid.

4. A process for the preparation of 6-aminopenicillanic acid which comprises contacting benzylpenicillin with a penicillin-splitting enzyme produced by the microorganism *Arthrobacter viscosus*, A.T.C.C. 15294, in an aqueous medium at a temperautre of about 20° to 50° C. and at a pH of about 7.0 to 9.5 to produce 6-aminopenicillanic acid.

5. A process for the preparation of 6-aminopenicillanic acid which comprises contacting benzylpenicillin with a penicillin-splitting enzyme produced by the microorganism *Arthrobacter viscosus*, A.T.C.C. 15294, in an aqueous medium at a temperature of about 30° to 40° C. and at a pH of about 8.0 to 9.0 to produce 6-aminopenicillanic acid.

6. A process for producing a penicillin-splitting enzyme which comprises cultivating the microorganism *Arthrobacter viscosus* in an aqueous nutrient medium under aerobic conditions to produce a penicillin-splitting enzyme.

7. A process for producing a penicillin-splitting enzyme which comprises cultivating the microorganism *Arthrobacter viscosus*, A.T.C.C. 15294, in an aqueous nutrient medium under aerobic conditions to produce a penicillin-splitting enzyme.

8. A process for the preparation of 6-aminopenicillanic acid which comprises cultivating the microorganism *Arthrobacter viscosus*, in an aqueous nutrient medium to produce a penicillin-splitting enzyme, and contacting benzylpenicillin with said enzyme to produce 6-aminopenicillanic acid.

9. A process for the preparation of 6-aminopenicillanic acid which comprises cultivating the microorganism *Arthrobacter viscosus*, A.T.C.C. 15294, in an aqueous nutrient medium to produce a penicillin-splitting enzyme, and contacting benzylpenicillin with said enzyme to produce 6-aminopenicillanic acid.

10. A process for the preparation of 6-aminopenicillanic acid which comprises cultivating the microorganism *Arthrobacter viscosus*, A.T.C.C. 15294, in an aqueous nutrient medium to produce a penicillin-splitting enzyme, contacting benzylpenicillin with said enzyme, and recovering 6-aminopenicillanic acid.

References Cited by the Examiner

UNITED STATES PATENTS 3,116,218  12/1963  Kaufmann et al. _____ 195—36

A. LOUIS MONACELL, *Primary Examiner.*

D. M. STEPHENS, *Assistant Examiner.*